United States Patent [19]
Kaneko

[11] Patent Number: 5,987,194
[45] Date of Patent: *Nov. 16, 1999

[54] IMAGE READING APPARATUS AND IMAGE RECORDING APPARATUS

[75] Inventor: Kiyoshi Kaneko, Yokohama, Japan

[73] Assignee: Canon Kabushiki Kasiha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/651,718

[22] Filed: May 22, 1996

[30] Foreign Application Priority Data

May 24, 1995 [JP] Japan ................................... 7-124980
Feb. 1, 1996 [JP] Japan ................................... 8-16597

[51] Int. Cl.⁶ .............................. G06K 9/20; H04N 1/46; H04N 1/40
[52] U.S. Cl. ......................... 382/323; 382/312; 358/505; 358/455
[58] Field of Search .................................. 382/323, 321, 382/312; 358/456, 455, 472, 674, 483, 494, 496, 505; 395/115, 118; 347/129

[56] References Cited

U.S. PATENT DOCUMENTS

| | | | |
|---|---|---|---|
| 4,525,748 | 6/1985 | Carbone | 358/456 |
| 5,101,282 | 3/1992 | Honma | 358/451 |
| 5,604,826 | 2/1997 | Kajita | 382/323 |

FOREIGN PATENT DOCUMENTS

| | | | |
|---|---|---|---|
| 0336403 | 10/1989 | European Pat. Off. | H04N 1/40 |
| 0497440 | 8/1992 | European Pat. Off. | H04N 1/04 |
| 0585028 | 3/1994 | European Pat. Off. | H04N 1/40 |
| 0641115 | 3/1995 | European Pat. Off. | H04N 1/024 |

*Primary Examiner*—Thomas D. Lee
*Assistant Examiner*—Wengpeng Chen
*Attorney, Agent, or Firm*—Fitzpatrick, Cella, Harper & Scinto

[57] ABSTRACT

An image reading apparatus includes a line sensor for reading an image of a document sheet, an A/D converter for converting image data from the line sensor to multi-level image data, a binarization comparator for converting the multi-level image data from the A/D converter to bi-level image data and an image processing IC for selectively outputting the multi-level image data from the A/D converter and the bi-level image data from the binarization comparator. The number of read pixels in the multi-level image data output mode is set to be smaller than the number of read pixels in the bi-level image data output mode.

17 Claims, 6 Drawing Sheets

IMAGE READING APPARATUS AND IMAGE RECORDING APPARATUS

BACKGROUND OF THE INVENTION

1. Field of the Invention

The present invention relates to an image reading apparatus for reading an image of a document sheet and an image recording apparatus for recording an image on a recording sheet.

2. Related Background Art

A printer having a recording head such as an ink jet head or a thermal head mounted on a carriage and recording an image on a record sheet by the recording head by moving the carriage has been used as an output device of a personal computer and a word processor.

In such a printer, it has been proposed to mount an image reading unit having a photo-electric conversion function in place of the recording head on the carriage to read an image of a document sheet for use as a scanner for inputting a read image data to the personal computer or the word processor.

In order for such a printer to fully function as the scanner, it is required to not only read the image of the document sheet as a black and white bi-level image but also read it as a multi-level image having black and white as well as half-tone densities as the processing function of the personal computer is enhanced.

However, in the reading of the multi-level image, the image processing of several times as much data amount as that required for the reading of the bi-level image is needed, and in order to allow both the bi-level image reading and the multi-level image reading, the system should be configured to meet the multi-level image reading operation which requires a large amount of data. This leads to the increase of a memory capacity and the increase of a processing time. When the system configured to fit the multi-level image reading operation is frequently used in the bi-level image reading, the construction for the multi-level image reading is wasted, which is not suitable.

SUMMARY OF THE INVENTION

It is an object of the present invention to provide image reading apparatus and image recording apparatus which allow not only the bi-level reading of a document image but also the multi-level reading of the document image with a simple construction.

It is another object of the present invention to allow the reading of the document image by utilizing a construction of an image recording apparatus for recording an image on a record sheet.

It is still another object of the present invention to provide image reading apparatus and image recording apparatus which allow high quality reading of an image with a simple construction.

In accordance with the present invention, there is provided an image reading apparatus comprising a line sensor for reading an image of a document sheet, first conversion means for converting image data from said line sensor to multi-level image data, second conversion means for converting the multi-level image data from said first conversion means to bi-level image data, and output means for selectively outputting the multi-level image data from said first conversion means and the bi-level image data from said second conversion means, wherein the number of read pixels in the multi-level image data output mode is smaller than the number of read pixels in the bi-level image data output mode.

In accordance with the present invention, there is also provided an image recording apparatus comprising feed means for feeding a record sheet, a carriage for mounting thereon a recording head for recording an image on the record sheet and drive means for moving said carriage relative to the record sheet, wherein a read unit for reading an image is removably mounted on said carriage in place of said recording head and said carriage having said read unit mounted thereon is moved relative to a document sheet fed by said feed means to read an image of the document sheet, and the number of read pixels in the multi-level image data output mode of the document sheet image is smaller than the number of pixels in the bi-level image data output mode.

The above and other objects of the present invention and the advantages thereof will become apparent from the following description of the invention.

DETAILED DESCRIPTION OF THE PREFERRED EMBODIMENTS

Figure 1:
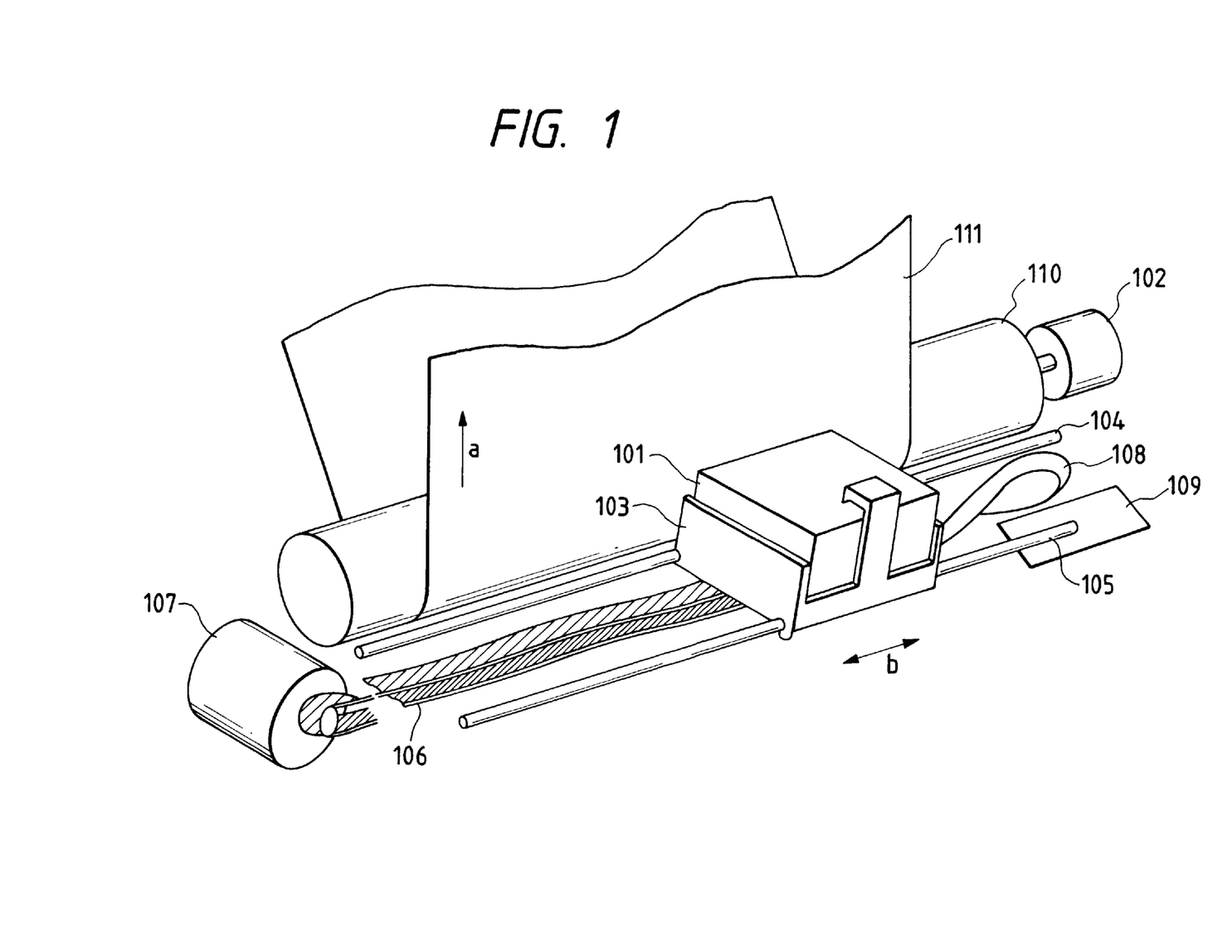
FIG. 1 shows a construction of an image recording apparatus in accordance with the present invention.

FIG. 1 shows a construction of an image recording/reading apparatus in accordance with the present invention. Numeral 101 denotes an ink jet head (recording head) having 128 ink orifices. The recording head 101 is removably mounted on a carriage 103. Numerals 104 and 105 denote guide shafts to axially movably hold the carriage 103 and numeral 106 denotes a belt which transmits a drive force of a carriage motor 107 to the carriage to reciprocally move the carriage 103 in a direction b along the guide shafts 104 and 105. Numeral 108 denotes a flexible printed circuit card (FPC) which electrically connects the print head 101 with a control circuit board 109. Numeral 110 denotes a sheet feed roller which is rotated by a roller motor 102 to feed a record sheet 111 in a direction a.

An image recording operation is now explained. As described above, the print head 101 has 128 ink orifices and the dot recording of up to 128 lines is made on the record sheet 111 as the carriage 103 is moved one run from the left to the right (forward movement) in FIG. 1. After the carriage 103 has completed one forward movement from the left to the right in FIG. 1, the sheet feed roller 110 is rotated to feed the record sheet 111 by the record width. Further, the carriage 103 is moved from the right to the left (backward movement) in FIG. 1 to be ready for the next image recording. By repeating the movement of the carriage 103 and the record sheet 111 a plurality of times, desired recording to the record sheet 111 is performed.

In the above description, the dot recording is made while the carriage 103 is moved forward. Instead, reciprocal printing in which the dot printing is made not only during the forward movement but also during the backward movement may be performed.

Figure 2:
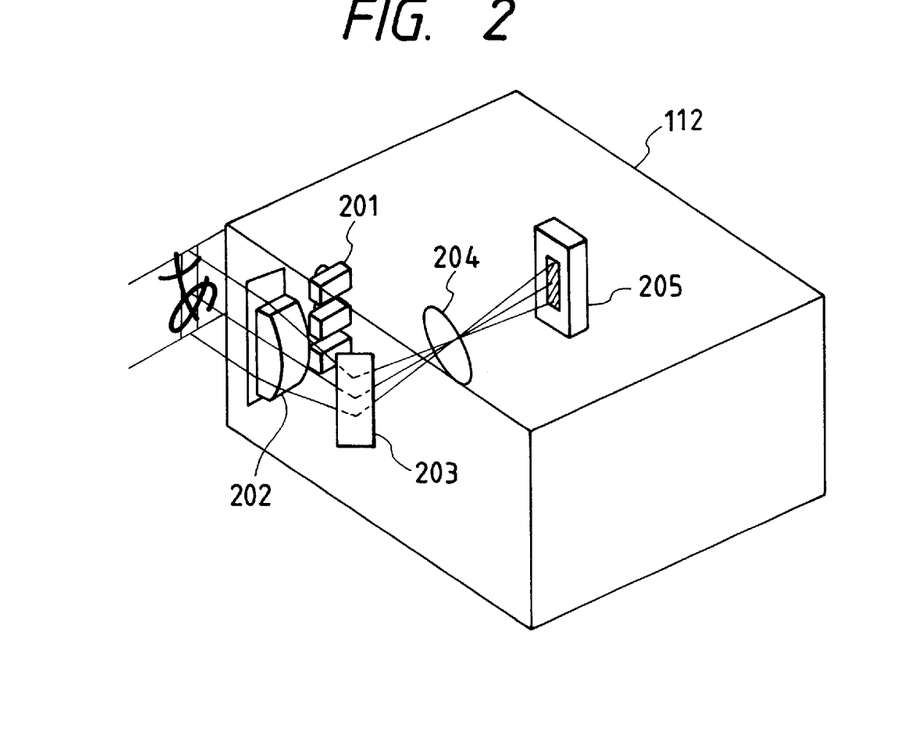
FIG. 2 shows an overall block diagram of the apparatus.

As described above, the recording head 101 is removably mounted on the carriage 103 and in the present embodiment, a scanner unit 112 shown in FIG. 2 is removably mounted on the carriage 103, in place of the recording head 101. The scanner unit 112 photo-electrically converts an image of a document sheet fed by the sheet feed roller 110 in place of the record sheet 111 and outputs it as an electrical signal.

In FIG. 2, numeral 201 denotes an LED for illuminating a light to a document sheet to be read, numeral 202 denotes a field lens, numeral 203 denotes a mirror and numeral 204 denotes a master lens which directs a reflected light from the document sheet illuminated by the LED 201 to a line sensor 205. The line sensor 205 has 128 pixels of photoelectric elements arranged in one line and outputs an analog image signal of a level representing a density of the document image.

A read operation to read the document image while the scanner unit 112 is mounted on the carriage 103 in place of the recording head 101 is now explained.

The recording sheet 111 is substituted by the document sheet and it is fed to a predetermined read position by the sheet feed roller 110. The carriage 103 having the scanner unit 112 mounted thereon is moved forward from the left to the right as it is in the recording operation. Thus, the image on the document sheet is read by the line sensor 205 with the 128-pixel width. After one forward movement of the carriage 103, the sheet feed roller 110 is rotated to feed the document sheet by the 128-pixel width and the carriage 103 is moved backward from the right to the left to be ready for the next image reading. By repeating the movement of the carriage 103 and the document sheet a plurality of times, the document image reading is performed.

In the above description, the document image is read during the forward movement although the image reading may be performed not only during the forward movement but also during the backward movement.

The distance of movement of the document sheet by the rotation of the sheet feed roller 110 by the roller motor 102 is not limited to the 128-pixel width but it may be one-half thereof (64-pixel width) or one quarter thereof (32-pixel width).

As will be explained later, the scanner unit 112 performs the reading in a bi-level read mode in which the image is read as black and white bi-level information and a multi-level read mode in which the image is read as multi-level information of three or more levels including half-tone densities, such as 8-bit 64 tone information.

Figure 3:
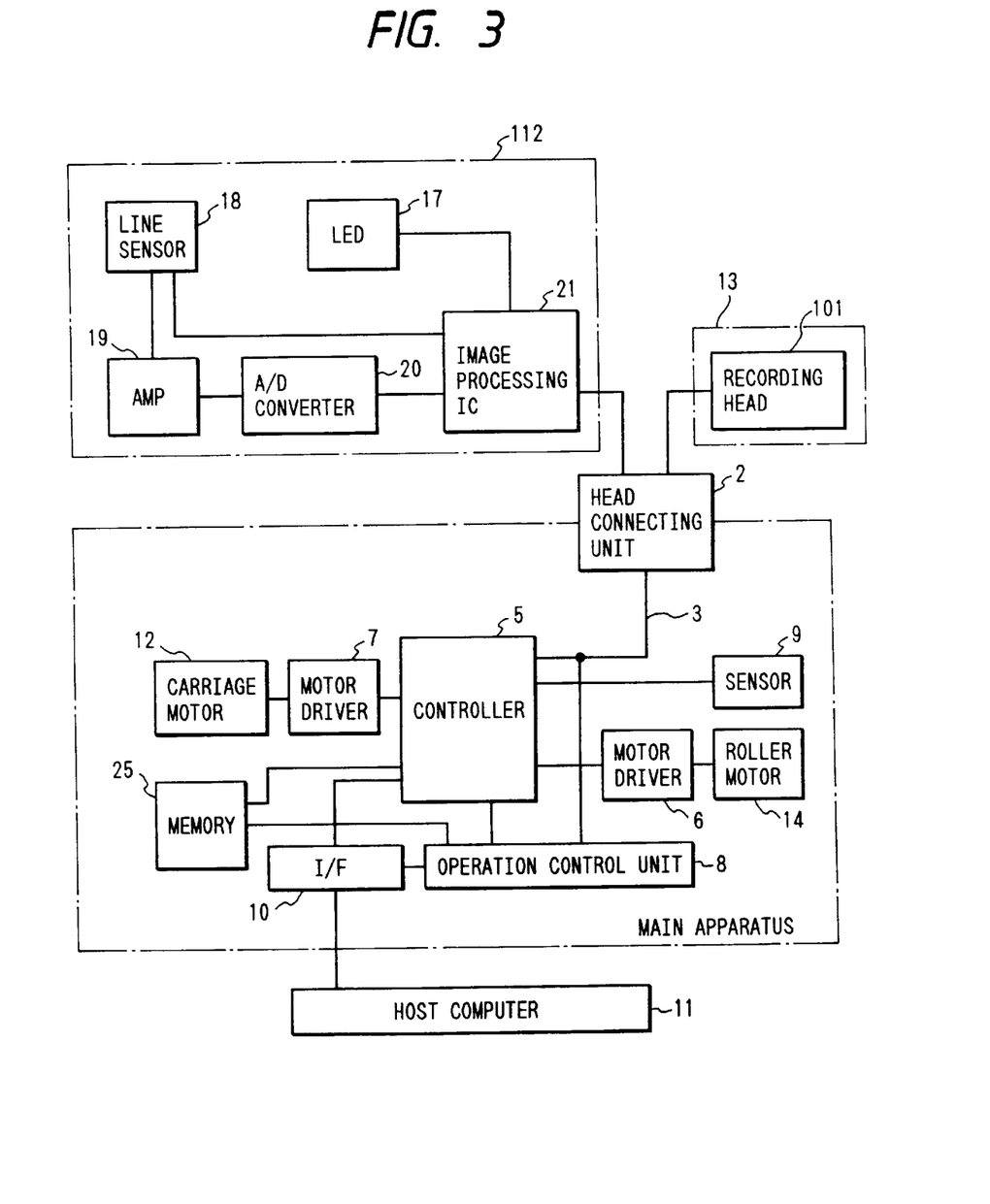
FIG. 3 shows a structure of major parts of a mechanical unit.

FIG. 3 shows a block diagram of an overall apparatus of FIG. 1. Depending on application, either the recording head 101 or the scanner unit 112 is connected to a head connecting unit 2.

An operation of the present apparatus when used as a recording apparatus is first explained together with functions and constructions of respective blocks. In this case, the recording head 101 is connected to the head connection unit 2.

Record data to be recorded (or printed, hereinafter referred to as recorded) such as characters or image is transferred from a host computer 11 through an interface (I/F) 10 under control of the host computer 11 and an operation control unit 8. A controller 5 receives the record data and processes it to dot data for the dot recording on the record sheet by the recording head 101 and stores the processed dot data in a memory 25. The controller 5 further reads the dot data from the memory 25 under control of the operation control unit 8, sends it to the recording head 101 through a head connection unit 3 (FPC 108 in FIG. 1) and the head connection unit 2 and dot-records characters or image on the record sheet.

A roller motor 14 (which corresponds to the roller motor 102 in FIG. 1) is rotated by the motor diver 6 which is controlled by the controller 5 to feed the record sheet.

A carriage 13 (which corresponds to the carriage 103 in FIG. 1) is moved by driving the carriage motor 12 by the motor driver 7 which is controlled by the controller 5.

A sensor 9 senses whether or not the document sheet whose image is to be read has been set on a document sheet table, not shown and whether or not the carriage 13 is at the start position.

Not only the characters or image data but also various parameters relating to the image recording and reading are inputted to the interface 10 from the host computer 11 and the operation control unit 8 performs the control operations in accordance with those parameters.

An operation of the present apparatus when used as the image reading apparatus is now explained. In this case, the scanner unit 112 is connected to the head connection unit 2.

In the image reading operation, the scanner unit 112 scans the document sheet in the same manner as that of the recording head 101 in the recording operation. An LED 17 (which corresponds to the LED 201 in FIG. 2) in the scanner unit 112 illuminates the document sheet and a reflected light of characters or image is detected by a line sensor 18 (which corresponds to the line sensor 205 in FIG. 2) having a photo-electric conversion characteristic. An analog signal representing the density of the image outputted from the line sensor 18 is amplified by an amplifier 19 to a level appropriate for handling in an analog/digital converter (hereinafter referred to as A/D) 20 and it is applied to the A/D. The digital version of the data is subjected to correction or image processing such as shading correction and binarization in an image processing IC 21 and it is then transferred to the apparatus as the image data.

The transfer is made to the host computer 11 through a reverse path to that flow of the record data in the recording operation. Namely, it flows from the image processing IC 21 through the head connection unit 2, the head connection unit 3 and the controller 5 to the memory 25. The controller 5 further sends the image data read from the memory 25 to the host computer 11 through the interface 10 in synchronism with the host computer 11. The controller 5 transfers the image data received from the image processing IC 21 in the form which is easy to transmit by the interface 10 or easy to handle in the host computer 11 under control of the operation control unit 8.

A switching operation of the number of read pixels in the image read operation is now explained. As described above, the present operation is operable in the bi-level read mode and the multi-level read mode. The read mode is indicated by the host computer 11 and the operation control unit 8 controls the operation of the apparatus in accordance with the mode.

Figure 4A:
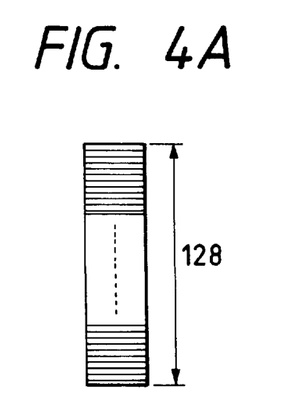
FIGS. 4A to 4C illustrate the number of sensor pixels.
Figure 5:
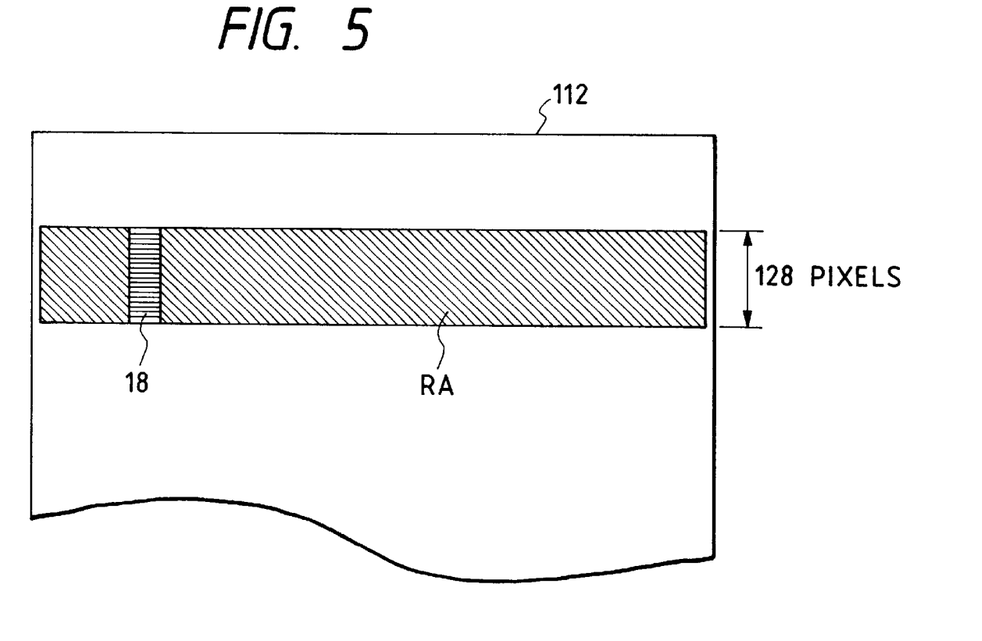
FIG. 5 illustrates a range of reading.

For example, when the number of pixels of the line sensor 18 is 128, the entire line sensor 18 is used to read the image as shown in FIG. 4A in the bi-level read mode. FIG. 5 shows a range of reading RA in the document sheet 112 when one line is scanned by using all of 128 pixels of the line sensor 18. Assuming that the one line length is 210 mm (lateral length of A4 size sheet) and a resolution is 360 dpi, the data amount is given by $$1(bit) \times 128(pixels) \times 360/25.4 \times 210(mm) = 380976.4(bits) \quad (1)$$

and a memory capacity of approximately 381K bits or more is needed. That is, the memory capacity of 1M bits is sufficient for the memory 25.

Since the memory 25 is also used when the apparatus is used as the recording apparatus, a minimum capacity for other operation control is needed.

An operation in the multi-level read mode, for example, 8-bit read mode is now explained. In the 8-bit read mode, the data amount when the reading is performed while using all pixels of the line sensor 18 may be calculated by multiplying 8 bits to the formula (1) above. Namely, it is 8×380976.4= 3.05M bits and the data cannot be stored unless the capacity of the memory 25 is significantly increased. This leads to the increase of cost and it is not desirable.

Figure 4B:
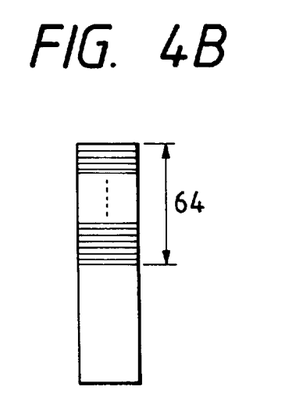
Figure 4C:
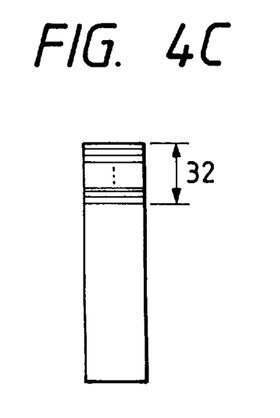

In the present embodiment, in the 8-bit multi-level read mode, the number of pixels for reading is reduced to one half of the total number 128 of pixels of the line sensor 18, that is, to 64 or to one quarter or 32 pixels as shown in FIG. 4B or 4C to reduce the data amount per scan, and the memory 25 is used as it is for the multi-level image reading.

Namely, as shown in FIG. 4C, when a quarter portion (any portion) of the line sensor 18 is used, the memory capacity of 3.05M/4=762.5K bits is sufficient. Accordingly, the memory 25 having the memory capacity of 1M bits may be used to construct the multi-level image reading apparatus without increasing the cost.

Figure 6:
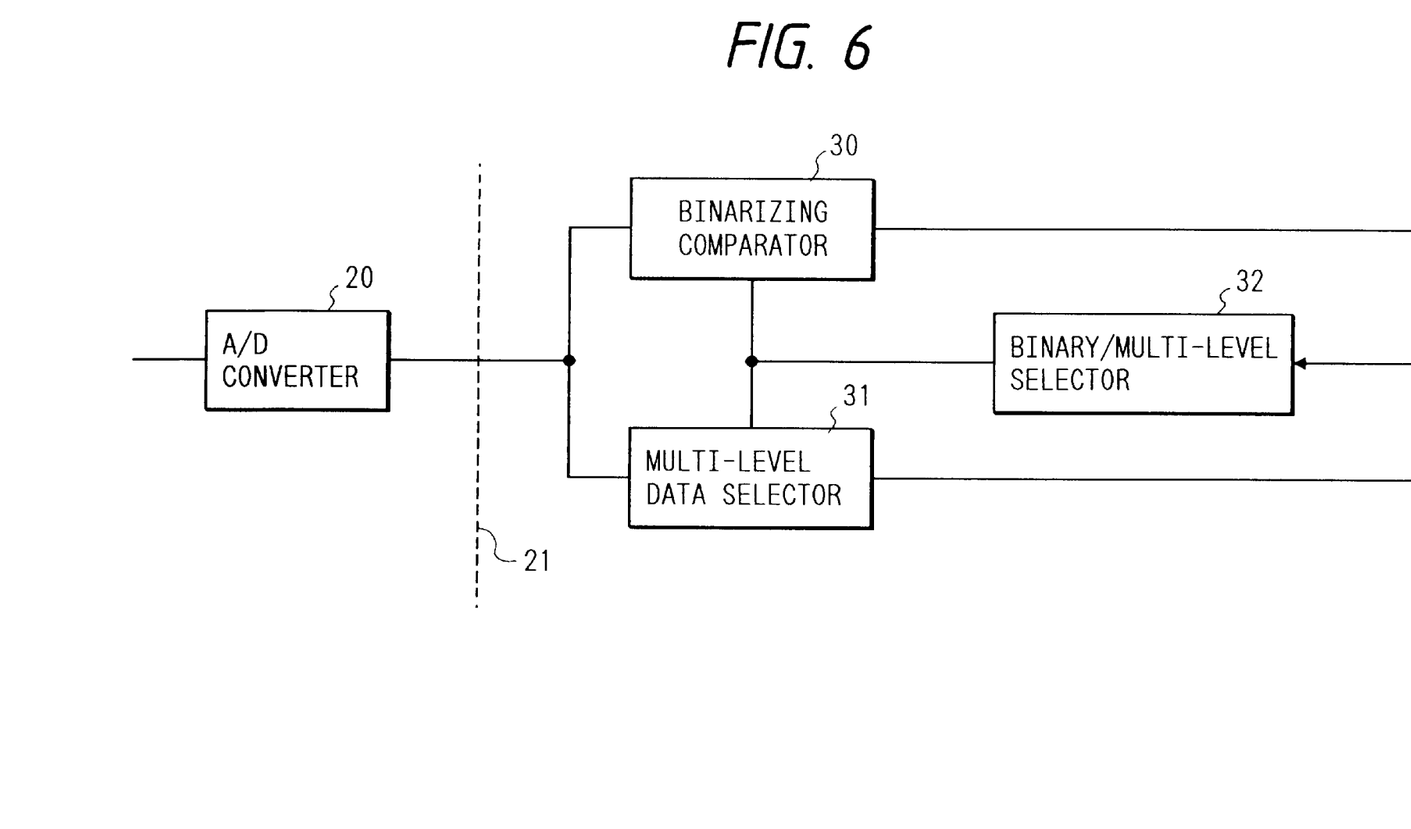
FIG. 6 illustrates selection of bi-level and multi-level.

Referring to FIG. 6, a configuration of the image processing IC 21 for the bi-level and multi-level read modes is explained.

Figure 7A:
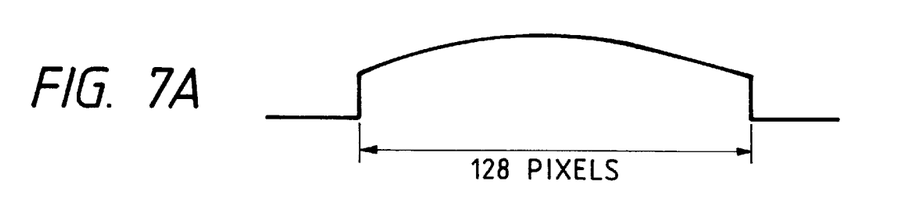
FIGS. 7A and 7B illustrate a range of reading in a signal.

In the bi-level read mode operation as instructed by the host computer 11, the analog signal derived by reading the image by all of the 128 pixels of the line sensor 18 is amplified by the amplifier 19 and it is converted to the digital data by the A/D converter 20. A bi-level/multi-level selector 32 selects a binarization comparator 30 in the image processing IC 21 in accordance with the instruction of the bi-level read mode and discriminates black and white (bi-level) of the digital data by using a predetermined threshold and outputs for all of the 128 pixels (FIG. 7A).

Figure 7B:
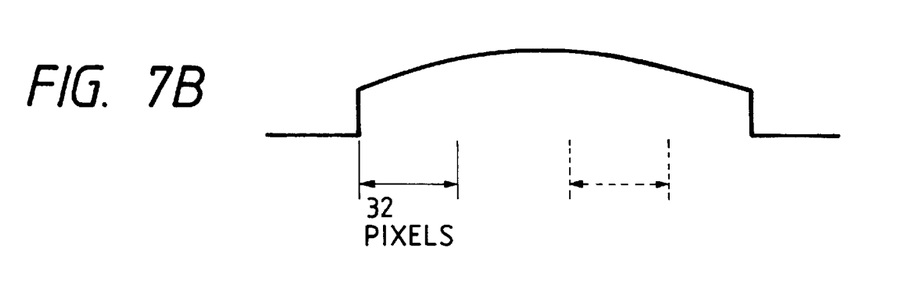

On the other hand, in the multi-level read mode operation, the analog signal of the image derived by reading the image by all of the 128 pixels of the line sensor 18 is amplified by the amplifier 19 and it is converted to the digital data (multi-level data) by the A/D converter 20. In this case, the bi-level/multi-level selector 32 selects a multi-level data selector 31 in the image processing IC 21 in accordance with the instruction of the multi-level read mode. The multi-level data selector 31 selects data for one quarter of the total number of pixels of the line sensor and the remaining three quarters are not used but discarded. Namely, the data for the 128/4=32 pixels shown in FIG. 4C is processed by the image processing IC 21 and it is outputted as the multi-level data (FIG. 7B). A range of the 32 pixels may by any part of the 128 pixels.

In the scan operation of the scanner unit in the multi-level read mode, the read width of one scan is one quarter of that in the bi-level read mode and hence the width of movement of the document sheet is also one quarter and the scan operation is performed four times as much in the multi-level read mode as that in the bi-level read mode.

In this manner, the bi-level reading and the multi-level reading of the image may be attained without significantly changing the configuration of the recording apparatus and without significant increase of the cost.

Mechanical and optical performance and accuracy of the present apparatus may be enhanced by using a specific portion of the line sensor 18.

Figure 8A:
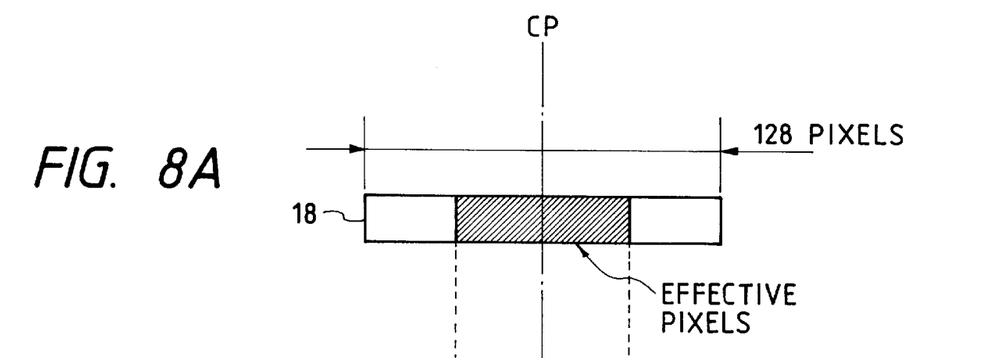
FIGS. 8A and 8B illustrate a range of reading.
Figure 8B:
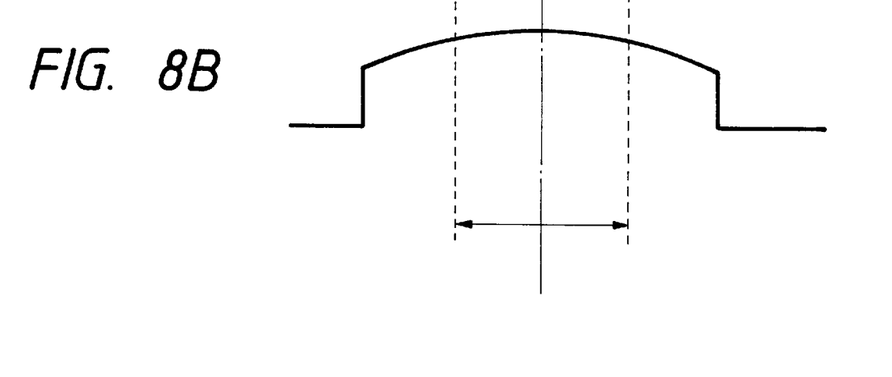

As shown in FIG. 8B, when a substantially white document sheet is read by the line sensor 18, the line sensor 18 receives a reflected light having a hill-shape distribution so that the output of the line sensor 18 is an electrical signal waveform having a hill-shape distribution.

This is due to the affect of the optical characteristics of the LED 201 which is the light source of the optical system in FIG. 2 and the lens 202, mirror 203 and lens 204 for directing the reflection light to the line sensor 18.

For example, it is commonly known that by a characteristic of the lens 204, the intensity of the light passing through the center of the lens and the intensity of the light passing through an outer edge are different (cosine fourth power rule), and a high level in the waveform of FIG. 8B corresponds to the center area of the lens 205 and the sensor 18 and a low level of the waveform corresponds to the outer edges (opposite ends) of the lens 205 and the line sensor 18.

Accordingly, even if a substantially uniform light intensity emanates from the document sheet as the reflected light, the outer edges (opposite edges) of the signal waveform shown in FIG. 8B receive less reflected light than that which the center area receives. This indicates that the resolution and the tonality which are the reference to the performance and the accuracy of the image reading apparatus are inferior in the outer edges (opposite ends) of the line sensor to the center area.

From the above, as shown in FIG. 8A, by using the 64 pixels or 32 pixels located at the center of the lens 205 and the line sensor 18 as effective pixels, the mechanical and optical performance and accuracy may be enhanced.

FIG. 8A shows an example in which 32 pixels on the left and right, respectively of the center CP of the line sensor 18 (total of 64 pixels) are used as the effective pixels.

It has been described that the use of the center area of the line sensor 18 by taking the characteristic caused by the lens 205 into consideration enhances the performance and the accuracy. Another example in which the use of the center area of the sensor 18 enhances the performance and the accuracy by a specific method for constructing the LED 201 which is the light source is explained below.

Figure 9:
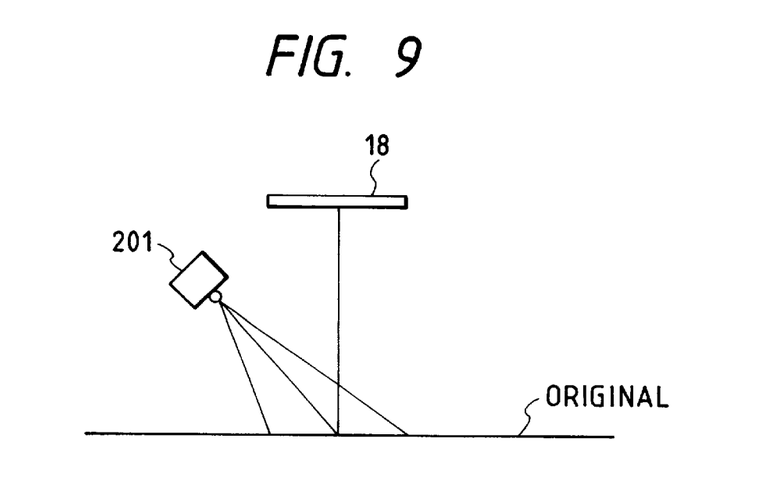
FIG. 9 illustrates a characteristic of illumination light intensity.

As described above, since the light source of the scanner unit 112 is the LED 201, the light source is substantially a point light source. Thus, as shown in FIG. 9, there are portions which are closer to the document sheet and farther from the document sheet and the illumination intensity exhibits a distribution. As a result, the reflected light which the line sensor received from the document sheet 18 exhibits a hill-shape intensity distribution depending on the distance from the LED 201 to the document sheet and the output waveform of the line sensor 18 exhibits a hill-shape distribution like that shown in FIG. 8B.

A high level portion at the center area of the hill-shape has a high illumination and exhibits high S/N ratio and tonality.

Accordingly, by using the center 64 pixels or 32 pixels of the 128 pixels of the line sensor 18 as they were in the previous embodiment, the image reading apparatus of high performance and accuracy is attained.

While 64 pixels of the 128 pixels of the line sensor 18 are used as the effective elements in the above embodiment, 32 pixels may be used in which case 16 pixels on the left and right, respectively, of the center CP of the line sensor 18 (total of 32 pixels) may be used.

The numbers of pixels on the left and right of the center CP need not be equal and they may be appropriately selected in accordance with the characteristic of the apparatus.

In the above embodiments, the line sensor has 128 pixels although it is not restrictive. Further, the multi-level reading may be performed by using the tonality other than 8-bit tonality.

The present invention is applicable to not only the image recording/reading apparatus but also to a dedicated image reading apparatus.

In the above embodiments, the read resolution by the scanner unit 112 is same for the bi-level read mode and the multi-level read mode. In an alternative embodiment, the resolution in the multi-level read mode is reduced to one half, for example and the image read width is set to one half of the total number 128 of pixels of the line sensor 18 (FIG. 4B). In this manner, the total data amount in the multi-level read mode is 32-pixel data amount (which is one quarter of that in the bi-level read mode) as it is in the previous embodiment.

In the first embodiment, the three quarters of the data which are not used are discarded after the output from the A/D converter 20. Alternatively, one quarter of the line sensor 18 may be activated and the three quarters may be deactivated and the signal from the line sensor 18 may be applied to the amplifier 19 and the A/D converter 20.

In accordance with the present invention, the bi-level reading of the image as well as the multi-level reading are attained with a simple construction and without significant increase of the cost.

While preferred embodiments of the present invention have been described, it should by understood that the present invention is not limited thereto but various modifications thereof may be made without departing from the scope of the claims.

What is claimed is:

1. An image reading apparatus for supplying image data representing an image of a document sheet to an external apparatus, comprising:

a line sensor having a plurality of photoelectric elements arranged in one line, for reading an image of the document sheet;

first conversion means for converting image data from said line sensor to multi-level image data;

second conversion means for converting image data from said line sensor to bi-level image data;

reception means for receiving from the external apparatus an instruction indicating an image data output mode;

output means for outputting the multi-level image data from said first conversion means when the received instruction indicates a multi-level image data output mode and outputting the bi-level image data from said second conversion means when the received instruction indicates a bi-level image data output mode; and selection means for selecting the number of the photoelectric elements of said line sensor to be used for reading the image in accordance with the image data output mode indicated by the received instruction, so that the number of photoelectric elements to be used in the multi-level image data output mode is smaller than the number of photoelectric elements to be used in the bi-level image data output mode.

2. An image reading apparatus according to claim 1, further comprising:

memory means for storing the bi-level image data and the multi-level image data output from said output means.

3. An image reading apparatus according to claim 1, wherein all photoelectric elements of said line sensor are selected in the bi-level image data output mode and a subset of the photoelectric elements of said line sensor are selected in the multi-level image data output mode.

4. An image reading apparatus according to claim 1, further comprising:

first drive means for moving an image read position of said line sensor in a first direction perpendicular to the line in which the plurality of photoelectric elements of said line sensor are arranged; and second drive means for moving the document sheet in a second direction perpendicular to the first direction.

5. An image reading apparatus for outputting image data representing an image of a document sheet to an external apparatus, comprising:

a line sensor having a plurality of photoelectric elements arranged in one line, for reading an image of the document sheet;

first conversion means for converting image data from said line sensor to multi-level image data;

second conversion means for converting image data from said line sensor to bi-level image data;

reception means for receiving from the external apparatus an instruction indicating an image data output mode;

output means for outputting the multi-level image data from said first conversion means when the received instruction indicates a multi-level image data output mode and outputting the bi-level image data from said second conversion means when the received instruction indicates the bi-level image data output mode; and selection means for selecting the number and positions of the photoelectric elements of said line sensor to be used for reading the image in accordance with the image data output mode indicated by the received instruction, so that in the multi-level image data output mode, the number of photoelectric elements to be used is smaller than the number of photoelectric elements to be used in the bi-level image data output mode and photoelectric elements located at a center of said line sensor are used for reading the image.

6. An image reading apparatus according to claim 5, further comprising:

memory means for storing the bi-level image data and the multi-level image data output from said output means.

7. An image reading apparatus accordance to claim 5, wherein all photoelectric elements of said line sensor are selected in the bi-level image data output mode and a subset of the photoelectric elements of said line sensor are selected in the multi-level image data output mode.

8. An image reading apparatus according to claim 5, further comprising:

first drive means for moving an image read position of said line sensor in a first direction perpendicular to the line in which the plurality of photoelectric elements of said line sensor are arranged; and second drive means for moving the document sheet in a second direction perpendicular to the first direction.

9. An image recording apparatus for recording an image on a record sheet based on image data from an external apparatus, comprising:

interface means for transmitting/receiving data to/from the external apparatus;

feed means for feeding the record sheet in a first direction;

a carriage for mounting thereon a recording head for recording an image on the record sheet fed by said feed means; and drive means for moving said carriage relative to the record sheet in a second direction perpendicular to the first direction, wherein a read unit, comprising a line sensor having a plurality of photoelectric elements arranged in one line, for reading an image is removably mounted on said carriage in place of the recording head, said carriage having the read unit mounted thereon is moved by said drive means relative to a document sheet fed by said feed means to read an image of the document sheet, and the read unit outputs image data representing the image, and wherein said interface means transmits either multi-level image data or bi-level image data in accordance with an image data output mode indicated by an instruction received by said interface means, and the number of photoelectric elements of the line sensor in the read unit to be used for reading the image is selected in accordance with the image data output mode, so that the number of photoelectric elements to be used in the multi-level image data output mode is smaller than the number of photoelectric elements to be used in the bi-level image data output mode.

10. An image recording apparatus according to claim 9, further comprising:

memory means for storing the multi-level image data and the bi-level image data to be transmitted by said interface means.

11. An image recording apparatus according to claim 10, wherein when the recording head is mounted on said carriage to record to record an image on the record sheet, said memory means stores the image data for the image recording.

12. An image recording apparatus according to claim 9, wherein all photoelectric elements of the line sensor are selected in the bi-level image date output mode and a subset of the photoelectric elements of the line sensor are selected in the multi-level image data output mode.

13. An image recording apparatus according to claim 12, wherein photoelectric elements located at a center of the line sensor are used for reading the image in the multi-level image date output mode.

14. An image recording apparatus according to claim 9, wherein said feed means feeds the document sheet an amount that varies in accordance with the image data output mode.

15. An image reading apparatus according to claim 1, wherein photoelectric elements located at a center of said line sensor are used for reading the image in the multi-level image data output mode.

16. An image reading apparatus according to claim 4, wherein said second drive means moves the document sheet an amount that varies in accordance with the image data output mode.

17. An image reading apparatus according to claim 8, wherein said second drive means moves the document sheet an amount that varies in accordance with the image data output mode.

* * * * *

UNITED STATES PATENT AND TRADEMARK OFFICE
CERTIFICATE OF CORRECTION

PATENT NO. : 5,987,194
DATED : November 16, 1999
INVENTOR(S) : Kiyoshi Kaneko

It is certified that error appears in the above-identified patent and that said Letters Patent is hereby corrected as shown below:

Title Page:
Item [56] References Cited, under FOREIGN PATENT DOCUMENTS:
insert: --2169168 7/1986 Great Britain--

Column 7:
Line 8, "128 of" should read --of 128--.

Signed and Sealed this

Third Day of July, 2001

*Attest:*

Nicholas P. Godici

NICHOLAS P. GODICI
*Attesting Officer*    *Acting Director of the United States Patent and Trademark Office*